June 3, 1924.
A. SCHWIENING
FLYTRAP
Filed March 28, 1922
1,496,135
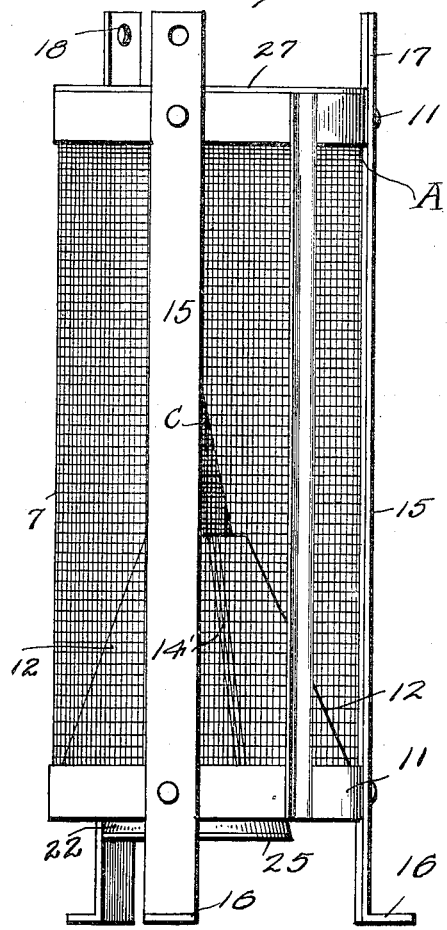
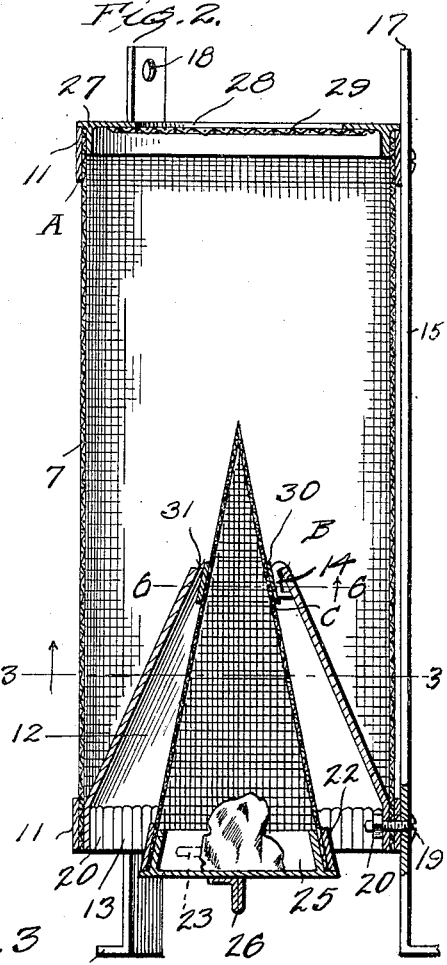
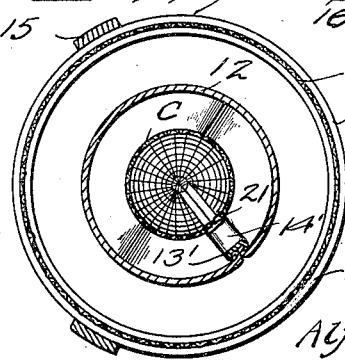
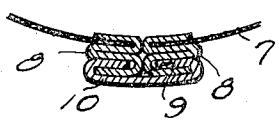
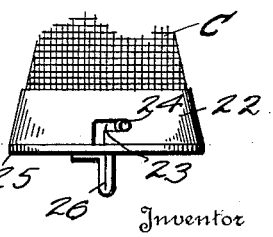
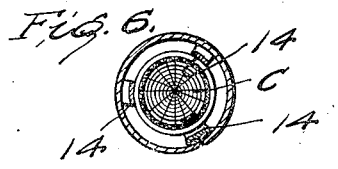
Inventor
Alfred Schwiening
By Bernard F. Garvey
Attorney Patented June 3, 1924.

1,496,135

UNITED STATES PATENT OFFICE.

ALFRED SCHWIENING, OF SONORA, TEXAS.

FLYTRAP.

Application filed March 28, 1922. Serial No. 547,366.

*To all whom it may concern:*

Be it known that I, ALFRED SCHWIENING, a citizen of the United States, residing at Sonora, in the county of Sutton and State of Texas, have invented certain new and useful Improvements in Flytraps, of which the following is a specification.

The present invention relates to fly traps and is especially adapted for use in catching the various species of flies which infest vegetation.

Some of the objects of the present invention are to provide a trap which may be positioned on a support or pendently carried by a support; to provide a trap having an inclosed bait holder which will render the bait inaccessible to the vermin but will expose the bait sufficiently to effectively use the aroma of the bait for enticing the vermin into the trap; to provide a trap composed of separable elements which are normally relatively flat to facilitate manufacture and transportation as well as replacement of worn parts; and to provide a trap of durable construction, inexpensive to manufacture and capable of expeditious assemblage.

Other objects of the invention will no doubt be apparent from the following description of the present preferred form of the invention taken in connection with the accompanying drawings wherein:—

Fig. 1 is a side elevational view of a trap constructed in accordance with this invention illustrating its application;

Fig. 2 is a vertical sectional view of the same;

Fig. 3 is a horizontal sectional view taken on the line 3—3 of Fig. 2 looking in the direction of the arrow;

Fig. 4 is a fragmentary sectional view showing to advantage the means employed for detachably connecting the marginal edges of the wire mesh trap body;

Fig. 5 is a fragmentary side elevational view of the trap cone showing the manner of securing the bait holder therein; and Fig. 6 is a horizontal sectional view taken on the line 6—6 of Fig. 2 looking in the direction of the arrow and showing to advantage the manner of spacing the bait holding cone from the truncated cone-shaped mount.

The device of this invention consists of a trap body generally designated A, a fly mount generally designated B and a bait holding cone generally designated C. The bait receiving cone C is concentrically mounted in the mount B and spaced from the latter as illustrated to advantage in Figs. 2 and 6. The trap body A consists of a wire mesh fabric 7 preferably of rectangular configuration which is equipped with metal binding strips 8 on its marginal edges. Each strip consists of a metal sheet which is reversely folded over a marginal edge of the wire mesh as illustrated to advantage in Fig. 4. The sheet is again reversely folded and the folds pressed into contiguity, and the outer margin of the sheet reversely folded but spaced from the contiguous folds so as to provide channels 9. These channels are adapted for the reception of a locking member 10. The locking member in the present instance consists of an oblong metal blank the margins of which are folded inwardly for sliding engagement in the channels 9. In this way said wire mesh body is maintained in a cylindrical shape although of course an other desired contour may be employed if so desired. The upper and lower marginal edges of the wire mesh fabric 7 are equipped with binding rings 11 for an obvious purpose.

The fly mount B is formed from a metal blank 12, preferably tin, the configuration of the blank being such that when it is folded, a truncated cone-shaped body will be provided, the lower margin of which is preferably fluted, as indicated at 13, and is snugly engaged with the lower inner periphery of the trap body A. The marginal edges of the metal blank 12 are bent inwardly at right angles and then reversely folded into parallelism with the inner face of the blank to provide flanges 13'. These flanges are secured together by a detachable locking plate 14'. Said locking plate is slidable over the flanges. Portions of the upper terminal of the blank are bent inwardly to provide resilient fingers 14 which are adapted to embrace the bait holding cone in a manner hereinafter described.

In order to support the trap, suitable means has been provided consisting of strips 15, the lower ends of which extend for an appreciable distance below the body A and are bent outwardly at right angles to provided supporting feet 16 adapted for engagement with the ground or other supporting object. The upper ends of said strips are extended beyond the upper terminal of the trap body to provide supporting fingers 17 each of which is provided with an aperture 18 through which suitable supporting means may be engaged for pendently supporting the trap from a tree or other object. The strips may be riveted or otherwise secured to the upper ring or band 11 while the strips are preferably detachably secured to the lower ring or band by means of bolts 19, the latter extending through the fluted lower end of the mount B and having nuts 20 threaded thereon whereby said mount is snugly engaged with the body A. By fluting the lower end of the mount B, casual displacement of the nuts 20 will be prevented and furthermore the lower margin of the mount will be thereby characterized by a maximum amount of resiliency as well as reinforced.

The bait holding cone C consists of a wire fabric body so shaped that when the marginal edges thereof are connected a conical member is provided. The marginal edges of the mesh body are connected by interlocked metal strips 21 in the same manner as the marginal edges of the wire mesh fabric 7 of the body A are connected. Consequently, it is not thought necessary to again explain this means. When it is desired to open the cone so as to lay the same flat, the locking member thereof is slidably removed in the same manner as the locking member 10 is removed from the strips 8 shown in Fig. 4. The lower terminal of the cone carries a reinforcing band which is provided with diametrically opposite bayonet slots 23. These slots are adapted for the reception of pins 24 which latter are formed on the outer periphery of a bait holder 25. The bait holder consists of a cup which is slidable within the lower end of the cone and is provided with an annular extension serving as an abutment to engage the band 22 for limiting upward movement of the holder in the cone. The bottom of the holder carries a finger piece 26 by which the holder is turned with facility to engage the pins thereof with or disengage the same from the bayonet slots 23.

Detachably mounted on the top of the trap body A, is a cap 27 the center of which is stamped out to provide a circular opening 28, over which is mounted a perforate covering 29, to permit passage of light into the top of the body.

Upon reference to Figs. 1 and 2 of the drawings, it will be apparent that the bait carrying cone depends for an appreciable distance below the lower end of the trap body A and fly mount B, yet the lower end of the cone is appreciably spaced from the feet 16 to avoid contact of said cone or the bait holder carried thereby, with the ground or other support upon which the trap is mounted. In this way, the bait will be exposed to the air so that the aroma or odor of the bait will be carried upwardly through the cone and into the trap body. By preference, the cone is equipped with a band 30 which is frictionally engaged by the fingers 14 to prevent mutilation of the fabric of the cone, at the same time serving as a guide to indicate the proper position of the cone in the trap body. The fingers 14 pendently support the bait holding cone, in an apparent manner. However, if desired, other means may be employed for detachably or permanently securing the cone to the fly mount. The band 30 is sufficiently spaced from the inner periphery of the mount 12 at the upper end of the latter to provide a space 31 through which the flies may pass into the trap body. It is desired that the mount B be made of black tin or metal or else that the inner face thereof be painted black so that light will appear only through the opening 31 and cone C to assist in attracting the flies upwardly.

As is apparent from the above the construction of this trap permits the same to be transported while relatively flat and the parts thereof may be quickly and conveniently assembled to form the trap. The bait may be renewed at any time desired and without inconvenience by simply removing the bait holder 25 in the manner above explained. Moreover, the trap body may be cleaned by removing the cap 27. The trap as constructed although especially adapted for vermin which infest vegetation may nevertheless be used as a fly trap for use in homes in catching house flies, etc. The device is comparatively simple in construction, may be manufactured of any desired material and in any desired size or sizes dependent upon the use to which it will be put. Moreover, the trap may be ornamented for house use. The preferred form of the invention herein shown especially adapts the trap for use in the open where it will be necessary for it to withstand the elements without in any way impairing its usefulness.

What is claimed is:—

1. A fly trap including a perforate body equipped with an inner non-transparent member, and a perforate bait holding cone mounted in said member.

2. A fly trap including a perforate trap body, an imperforate fly mount and a perforate bait holding cone, said cone being mounted in but spaced from the mount to permit the passage of flies between said mount and cone, the mount being snugly engaged with the inner periphery of the trap body to prevent the passage of flies between said body and mount, and means to support said body and retain the latter spaced from its support.

3. A fly trap including a perforate member folded into a cylindrical shaped body and equipped with strips on its margins, means locking said strips together, an imperforate truncated cone-shaped mount arranged in said body and equipped with resilient fingers, a perforate bait carrying cone slidably mounted through the truncated end of said body to be frictionally engaged by the fingers of the latter, and means carried by said body to support said trap.

4. A fly trap including a perforate fly receiving body, a non-transparent truncated cone arranged in said body, and a perforate bait holding cone detachably mounted in the apex of said truncated cone.

In testimony whereof I affix my signature.

ALFRED SCHWIENING.